Feb. 26, 1952   M. A. HALL   2,587,314
SANDWICH GRILL
Filed March 31, 1949   2 SHEETS—SHEET 1
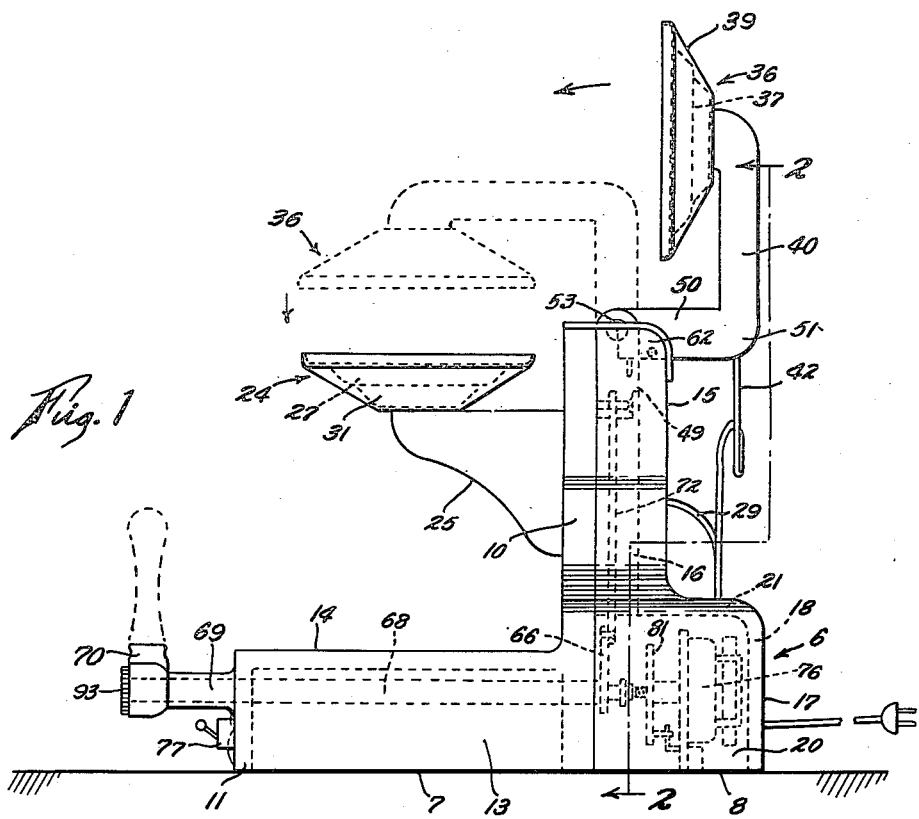
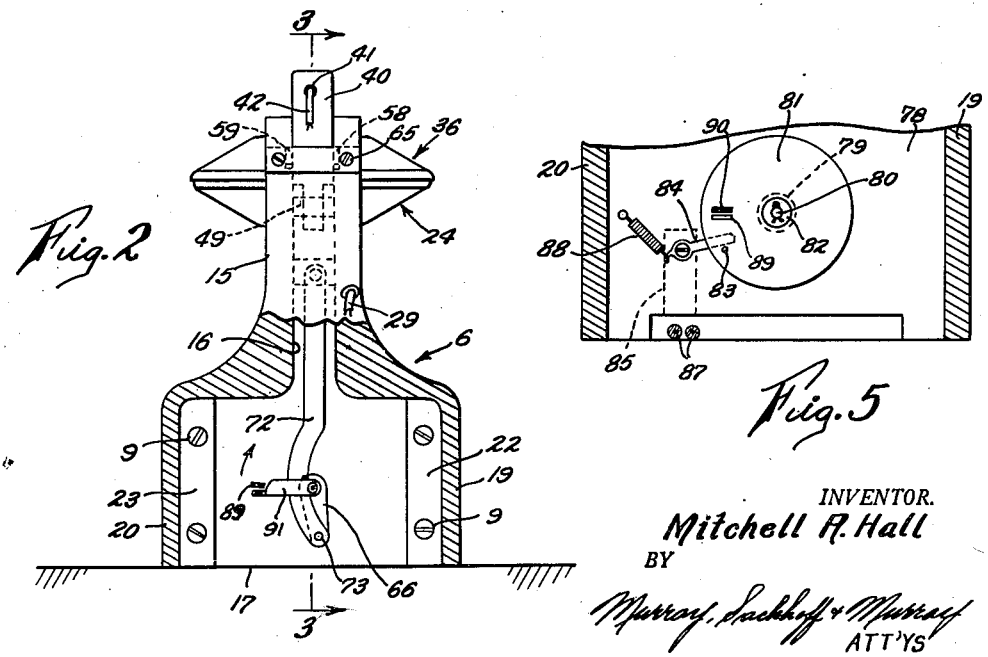
INVENTOR.
Mitchell R. Hall
BY
Murray, Sachhoff & Murray
ATT'YS Feb. 26, 1952  M. A. HALL  2,587,314
SANDWICH GRILL
Filed March 31, 1949  2 SHEETS—SHEET 2
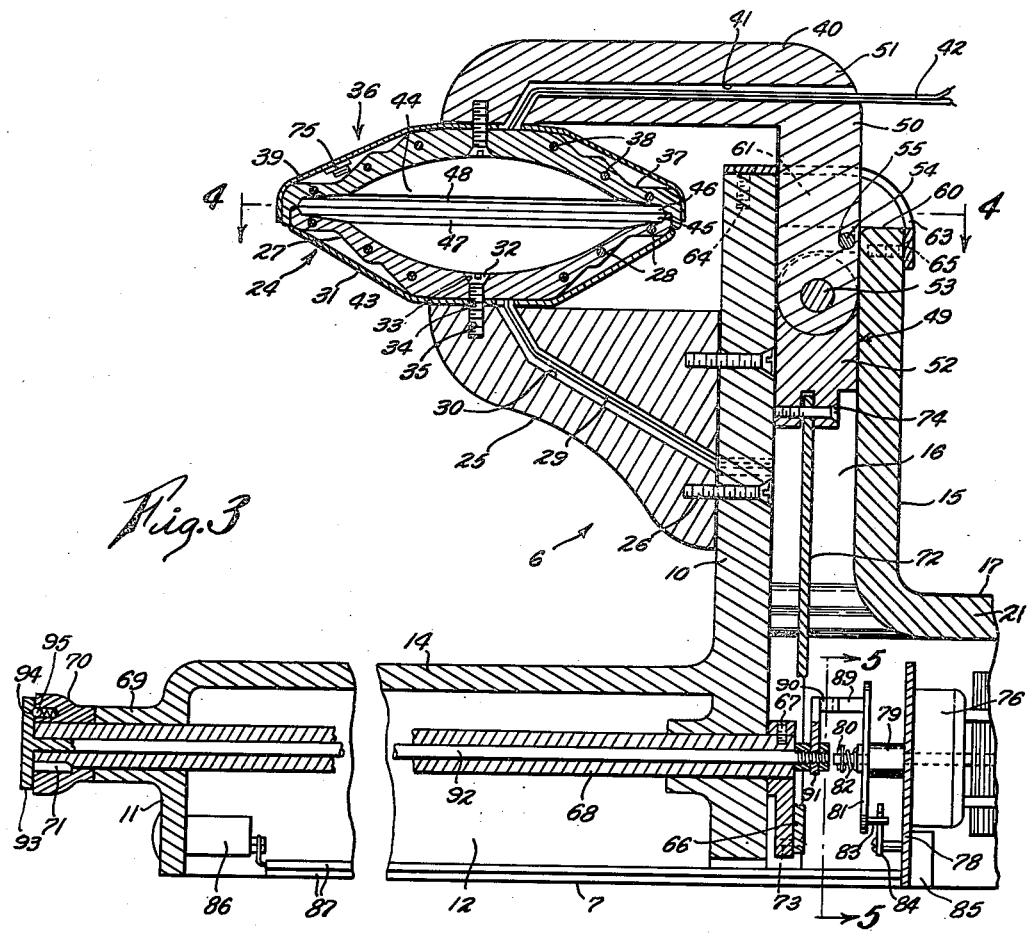
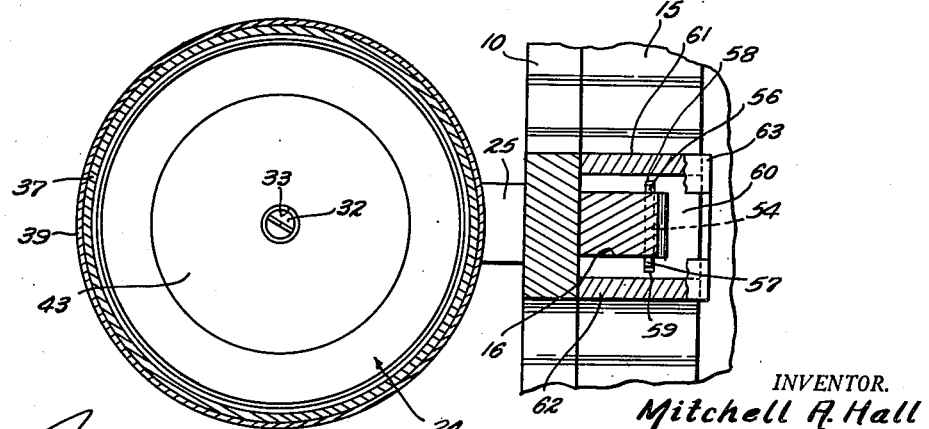
INVENTOR.
Mitchell A. Hall
BY
Murray, Sackhoff & Murray
ATT'YS Patented Feb. 26, 1952

2,587,314

UNITED STATES PATENT OFFICE 2,587,314

SANDWICH GRILL

Mitchell A. Hall, Fort Thomas, Ky., assignor to Bar-B-Buns, Inc., Norwood, Ohio, a corporation of Ohio Application March 31, 1949, Serial No. 84,630

10 Claims. (Cl. 99—342)

This invention relates to devices for making filled, toasted sandwiches, or the like, and is particularly directed to an improved mechanism for operating the heated, cooperating dies for devices of this character.

It is an object of this invention to provide an improved operating mechanism for the die members of a sandwich grill that are adapted to initially sever excess material from the food product, and then confine and form the retained material whilst it is being heated and toasted therebetween.

Another object of the invention is to provide in a device of the foregoing character a means for disposing a movable die member in an inoperative position relatively remote from a stationary die member so that each may be readily prepared for the heating and toasting operations.

A further object of this invention is to provide an improved sandwich grill especially designed for restaurant use which has a novel combination and arrangement of parts, is thoroughly reliable and efficient for the purposes for which it is intended, and can be readily cleaned and quickly prepared for use.

To the foregoing ends, generally stated, my invention consists of the novel devices and combination of devices hereinafter described, illustrated in the drawings, and defined in the appended claims.

In the accompanying drawings which show a preferred embodiment of my invention, like characters indicate like parts throughout the several views, wherein:

Fig. 1 is a side elevational view of my sandwich grill in open, inoperative position; an intermediate position of the movable die member therefor being illustrated by dotted lines.

Fig. 2 is a section taken on line 2—2 of Fig. 1 showing the die members in closed, operative position.

Fig. 3 is an enlarged section taken on line 3—3 of Fig. 2.

Fig. 4 is a section taken on line 4—4 of Fig. 3.

Fig. 5 is a section taken on line 5—5 of Fig. 3.

In the drawings the numeral 6 is a stand comprising a front section 7 and a rear section 8 which may be separate aluminum castings disposed in face to face relationship and joined together by bolts 9. The front section has a solid standard 10 relatively wide across its transverse lower portion and tapering upwardly to a narrow upper end portion. The lower portion of the standard is integrally joined to a hollow, forwardly extending base having a front wall 11, side walls 12 and 13 and a top 14; whilst the rear section 8 has a standard 15 identical in transverse outline to the solid standard 10 and differing therefrom in that it has formed therein a vertical guideway or slot 16 that is preferably square in plan. This slot is open at the upper end of the standard and opens at its lower end into the interior of a hollow base portion 17 of the rear section. This hollow base comprises a rear wall 18, and side walls 19 and 20 all interconnected along their upper ends by a top wall 21. It will be noted that the slot or guideway 16 is closed throughout its vertical extent by the rear face of the front section 7 and that the bolts 9 for securing the sections together are passed through countersunk holes in inwardly directed flanges 22 and 23 formed on the rear section and are threaded in tapped holes formed in the front section.

A stationary die member 24 is mounted on an arm 25 which in turn is secured by bolts 26 to the standard 10 of the front section. The die member may be a casting 27 which has embedded therein an electric heating element 28 which has its terminal leads 29 passing through a bore 30 formed through the arm 25. As most clearly illustrated in Fig. 3 the die member casting is surrounded by a shield 31 made of heat insulating material that is provided with a smooth exterior surface which is readily cleaned and polished. The shield and the casting are secured to the outer end of the arm 25 by a screw 32 which passes through a countersunk hole 33 formed centrally in the casting, and an aligned hole 34 formed in the shield, and is threaded in a bore 35 formed in the arm.

A complementary die member 36 is mounted on the stand for movement to and away from the stationary die member for the purpose of forming, shaping and then toasting and heating a food product held therebetween. The complementary die member is similar in all respects to the member 24 and comprises a casting 37 with a heating element 38 embedded therein, the upper surface of the casting being enclosed by a shield 39 of heat insulating material. The casting and shield are mounted on a movable arm 40 by means of a centrally located screw which passes through aligned openings formed in the casting and the shield and is threaded in the arm 40. The arm has a bore 41 formed therein through which terminal leads 42 for the heating element 38 pass.

As illustrated in Figs. 3 and 4 cooperating pockets 43 and 44 of the die members 24 and 36 respectively are relatively deep at their center portions and converge outwardly to shallow marginal portions. It will be noted that the peripheries of the die members 24 and 36 overlap when the members are in operative closed positions and that each has formed therein an inclined wall portion 45 and 46 respectively adjacent the overlapped peripheries, and annular ring portions 47 and 48 respectively formed between the wall portions and the marginal portions of the pockets for the members.

When the die members are in opened, inoperative positions two pieces or slices of a baked dough product with a food filler therebetween are placed upon the stationary die with the excess of the slices extending beyond the marginal flanges of said dies. The movable die member is then moved down upon the food product and as it moves into operative, closed position the respective flanges are brought into overlapping relationship which severs excess material of the baked dough product, which falls into a pan, or the like, positioned upon the top 14 and beneath the dies. The retained food product is formed during a major part of the movement of the movable die toward the stationary die for it is compressed and squeezed together during said movement until the die members are brought into the closed position illustrated in Fig. 3 where the outer surfaces of the product are toasted whilst the inner material is heated. During the toasting and heating operation the inclined wall portions 45—46 and the annular ring portions 47—48 formed around the peripheries of the die pockets 43—44 compress and heat the peripheral portions of the dough product to form an effective seal for the filler within the sandwich after the finished sandwich is removed from the grill.

Thus, the sandwich between the dies is shaped and formed by the pressure exerted between the movable, female die member 36 and the stationary, male die member 24. As die 36 approaches die 24 from above and in straight line movement with the respective faces of the dies in parallel relationship, the peripheral flange of the female die 36 snugly fits about the rim of male die 24 and exerts a shearing action on the edges of bread overhanging the male die. This trimming of the sandwich to the shape of the die members is accompanied by compression of the margin of the sandwich so that an envelope of bread is formed about the filling material.

The mechanism for actuating the movable die member 36 comprises an articulated, two-part plunger 49 which is slidably mounted for vertical reciprocating movement within the guideway 16. As most clearly illustrated in Fig. 3 the upper part of the plunger is a straight bar 50 which extends upwardly beyond the standard and is integrally connected to the die carrying arm 40 by a right-angled bend portion 51. The lower or second plunger part comprises a block 52 slidably positioned within the guideway 16, the adjacent ends of the plunger parts 50 and 52 having transversely reduced, overlapping ears hingedly joined together by a pintle 53. An offset stop pin 54 passes through a transverse bore 55 formed through the plunger part 50 adjacent the hinge and has its lateral ends 56 and 57 projecting beyond the plunger (Fig. 4). Clearance slots 58 and 59 are milled in the upper end of the guideway for receiving the ends 56 and 57 respectively of the stop pin 54.

The upper end of the standard 15 has a substantially flat platform 60 disposed at a level below the upper end of the standard 10, the standard 15 preferably having side walls 61 and 62 at its upper end which extend upwardly from the sides of said standard to a position flush with the upper surface of the standard 10. As shown in Figs. 1 and 3 the rear portions of said walls are curved and merge with the vertical rear surface of the standard 15. An abutment preferably in the form of a rectangular metal stamping 63 provided with a square central hole is secured to the upper end of the standard 10 by countersunk screws 64 and to the rear surface of the standard 15 by countersunk screws 65.

As illustrated in Fig. 4 the side portions of the stamping 63 extend inwardly beyond the side walls 61 and 62 and project into the paths of the extensions 56 and 57 of the stop pin 54 whereby upon upward movement of the hinged plunger toward inoperative position the extensions will engage the abutment and because said stop pin is offset rearwardly with respect to the longitudinal center of the hinge pintle 53 of the plunger the arm 40 will be tilted backwardly to the position illustrated by full lines in Fig. 1. In this position the rear surface of the first plunger part 50 will rest upon the platform 60 thus precluding further clockwise movement of the arm 40 and the movable die member carried thereby.

The mechanism for reciprocating the plunger comprises a cam arm 66 fixed by a set screw 67 to the rearward end of a hollow operating shaft 68 which in turn is journaled in the front wall 11 and in the lower portion of the standard 10. The front wall has a forwardly extended journal bearing 69 for mounting the forward end of the shaft and a manually operable lever 70 is fixed to said forward end of the shaft by a key 71, or the like. A link 72 is pivoted at 73 to the cam arm 66 and has its upper end extending through the lower portion of the guideway 16 with its upper extremity pivotally mounted to the lower end of the second plunger part 52 by a pivot pin 74. It will be noted that the completely closed position of the dies, as shown in Figure 2, is consummated by turning lever 70 just beyond a position corresponding to a dead center of the die actuating mechanism, i. e., crank 66 and connecting rod 72. This correlation of the closed position of the dies and the beyond dead center position of the crank and connecting rod, both shown in Figure 2, results in latching the dies in closed position, since any tendency for the material between the dies to expand upon heating of the sandwich cannot move the crank and connecting rod mechanism back through its dead center, and therefore the dies do not part.

With reference to Figs. 1 and 2 of the drawings it will be noted that the cam 66 is adapted for oscillation through 180° and that its greatest leverage is obtained during the initial and final phases of its rotation in mold feeding and mold returning directions; and that the greatest mold speed, with a proportional reduction of power, is obtained during intermediate rotational movement of the cam when power is not required for the efficient operation of the molds.

Different food products to be toasted and heated between the die members require different heating periods and it is contemplated that a bank of my grills would all be in operation at one time preparing sandwiches made of various products. I have therefore positioned a thermostatic limit switch 75 in one of the die members, such as the member 36, which is permanently set to automatically maintain the heat generated by the elements 28—38 below the temperature where the material of all food products will be unburned regardless of the amount of time they remain between the members. To save time and electric energy I also provide the grill with an electric control which may be readily set for a predetermined time period consistent with the type of food product to be heated and which will energize a visual warning signal upon the elapse of the said time period so that the operator may tell at a glance which of the sandwich grills in the bank have completed their heating periods. This control comprises a synchronous motor 76 which is continually operating whilst the grill is being used; the source of electricity therefor being preferably controlled by an off-on switch 77. The switch might also control the electric circuits for the heating elements for the die members, if desired.

The synchronous motor is fixed to a lateral mounting plate 78 detachably secured and extending between the side walls 19 and 20 of the rear casting of the stand, said motor being adapted to drive a hub 79 which has an integral, forwardly extending shaft 80 thereon. A fiber disc 81 is freely mounted on the shaft 80 and is in frictional drive with the hub 79 by a spring clutch 82 which bears against the forwardly disposed face of the disc. The disc has a rearwardly extending pin 83 which normally maintains an arm 84 of a switch 85 in switch closed position whereby the latter closes a circuit to a warning signal light 86 connected to it by lines 87. With reference to Fig. 5 it will be noted that the switch arm is biased toward open switch position by a spring 88 which imparts to the arm sufficient energy to open the switch but not enough to preclude its movement to switch closed position when it is contacted by pin 83 on the drive disc 81.

The disc also has a lug 89 extending forwardly therefrom which is disposed in the arcuate path of a setting lug 90 extending rearwardly from an arm 91 fixed to the end of a control rod 92 that passes through the center of shaft 68. The forward end of the rod is provided with a knurled, setting knob 93 which has a circular row of holes 94 formed in its inner face which successively receive a spring urged ball detent 95 in the hub of handle 70.

The successive annular positions of the knob 93 and the arm 91 relative to the shaft 68 are determined by the holes 94 in the knob and the ball detent and may be marked in seconds of time on the knob and refer to an indicator marked on the handle, thus there may be seven equispaced holes in the knob and the corresponding seconds 0', 10', 20', 30', 40', 50', and 60' also marked on the knob. The force required to unseat the ball detent from a cooperating hole is greater than the force necessary to rotate the disc 81 so that rotation of the arm 91 with the shaft will rotate the disc with it if and when their lugs 89 and 90 respectively come into contact.

As has been said the motor 76 is continuously operable and as illustrated in Fig. 5, preferably drives the hub 79 in a clockwise direction thus carrying with it the disc 81 because of the spring operated friction clutch device 82 between them. Whilst the die members are in open inoperative positions (Fig. 1) and assuming the knob to be set 0', the knob 93 is set by rotating it to the number of seconds on the dial required as the heating time for the food product to be toasted. This motion rotates the control rod 92 which sets up counter rotation of the lug 90 which in turn rotates the lug 89 on the disc counterclockwise. This rotation of the disc moves the pin 83 from switch arm 84 thereby opening the switch and deenergizing warning light 86. The die members are now closed and in so doing the lug 90 is moved clockwise about 180°, thereby permitting the disc 81 to be rotated in a clockwise direction by the motor until the pin 83 thereon contacts and moves the switch arm 84 to switch closed position to energize the warning lamp. The operator thereupon opens the die members which carries the lug 90 in a counterclockwise position (Fig. 5) 180° which resets the disc at its previous normal position thus opening the switch 85 and deenergizing the light.

It will be understood that the die members for the grill may be made in a variety of forms and that any standard equipment may be used therewith, such as temperature indicators, thermostatic controls or other means for indicating the temperature or for control or shutting off the electric current to the heating elements. In this respect it may be desirable to place a double-throw, double-pole switch in the base of the front casting to be actuated by rotation of the shaft 68 whereby the circuit to the heating elements may be switched to a parallel circuit with the source of electricity during the heating operation and switched to a series relationship with the source of electricity when the die members are in inoperative, open positions, thereby maintaining the members in semi-heated condition during periods of nonuse with a consequent saving of electricity.

In operation my sandwich grill would be in the inoperative position shown in full lines in Fig. 1 whereby the surface of the die members may be readily prepared for toasting a sandwich. It will be noted that movable die member 36 is disposed in an out of the way position so that the food product to be heated may be prepared and positioned upon the stationary die member 24. When it is desired to close the die members adjustment of the time control knob 93 is observed and if necessary set to the proper heating time, then the lever 70 is manually operated and the initial counterclockwise movement of the cam (Fig. 2) will cause the plunger part 52 to move downwardly in the guideway 16 whereby plunger part 50 will be pulled downwardly into the guideway and swing the plunger and mold part to a position illustrated in dotted lines in Fig. 1. It requires a relatively great amount of force to move the plunger part 50 from its horizontal to its vertical position and this said movement is provided by the cam during its initial phase when a great amount of force or leverage is exerted thereby. As the mold moves down upon the food product the cam moves at a relatively great rate of speed when power is not required for its movement. The final feed movement of the cam supplies a great amount of power to the die members so that they may readily cut and squeeze the food product therebetween. As illustrated in Fig. 2 the die members are locked by the cam by moving the pivoted connection 73 between the link 72 and the cam to an overcenter position with the link stopped by abutment against the side of the control rod.

Upon completion of the sandwich heating and toasting operation, as indicated by energization of the warning light 86, the die members are opened by grasping the lever 70 and rotating it so that the cam 66 is moved in a clockwise direction from its position illustrated in Fig. 2. The initial movement of the cam in said direction is adapted to unlock the die members by swinging the pivot 73 on the opposed side of its dead center position relative to the axis of the operating shaft 68. The initial movement beyond dead center also provides sufficient force for initially opening the die members and it will again be noted that the intermediate movement of the die member will be relatively rapid whilst the final tilting of the die member from its dotted line position to its full line position, illustrated in Fig. 1, will have a relatively great amount of force for tilting the movable die member when the stop pin extensions engage the abutment disposed upon the upper end of the standard.

What is claimed is:

1. In a device of the character described a stand, a standard carried by the stand, a stationary die member sustained by the standard, a two-part, joined plunger mounted for reciprocating movement within the standard, a pressure applying die member mounted on one plunger part, driving means associated with the remaining plunger part for actuating said pressure applying die member toward and away from the stationary die member, a control lever for operating said driving means, a stop on the first mentioned plunger part, and an elongated, fixed abutment on the standard disposed in the path of the stop and extending laterally therefrom, and being fixed on the stand in position to cause pivotal movement of said plunger part adjacent its extended limit of motion.

2. In a device of the character described the combination of a stand having a guideway formed therein, a stationary die member mounted on the stand, a two-part, jointed plunger disposed within the guideway, drive means for reciprocating the plunger and connected with one plunger part, a complementary die member mounted on the remaining plunger part and movable thereby relative to the stationary die member, a stop on the said plunger part, and a fixed elongated abutment on the stand disposed in the path of the stop and extending laterally therefrom and adapted for sliding contact with the stop when the said plunger part leaves the guide to secure pivotal movement of said plunger part.

3. In a device of the character described the combination of a stand, a vertical guideway for the stand, a stationary die member mounted on the stand, a two-part, jointed plunger operatively disposed within the guideway for reciprocating movement therein, drive means for reciprocating the plunger and connected with one of the plunger parts, a complementary die member mounted on the remaining plunger part and movable thereby toward and away from the stationary die member, a stop positioned on the said plunger part to one side of the vertical center line therefor, and an elongated, fixed abutment on the stand disposed in the path of the stop and projecting laterally therefrom and adapted to slidably contact the stop as the said part leaves the guide near its inoperative position to secure pivotal movement of the said plunger part.

4. In a device of the character described the combination of a stand, a vertical guideway for the stand, a stationary die member mounted on the stand, a two-part, jointed plunger operatively disposed within the guideway for reciprocating movement therein, drive means for reciprocating the plunger and connected with the lower plunger part, a complementary die member mounted on the upper plunger part and movable thereby toward and away from the stationary die member, a stop positioned on the said plunger part to one side of the vertical center line therefor, and an elongated, fixed abutment on the stand disposed in the path of the stop and extending laterally therefrom and adapted to slidably contact the stop as the said part leaves the guide near its upper inoperative position to secure pivotal movement of the said plunger part.

5. In a device of the character described the combination of a stand having a vertical guide, a stationary die member mounted on the stand, a first plunger part slidable in the guide and having its upper end extending beyond the stand, a complementary die member mounted on the extended portion of said plunger part and movable thereby toward and away from the stationary die member, a second plunger part hinged to the first plunger part and slidable within the guide, means on the stand for reciprocating the second plunger part, a stop position on the first plunger part to one side of the vertical center line thereof, and an elongated, fixed abutment on the stand disposed in the path of the stop and extending laterally therefrom and adapted to slidably contact the stop as the said first plunger part leaves the guide to secure pivotal movement of the said plunger part.

6. In a device of the character described the combination of a stand having a vertical guide, a stationary die member mounted on the stand, a first plunger part slidable in the guide and having its upper end extending beyond the stand, a complementary die member mounted on the extended portion of said plunger part and movable thereby toward and away from the stationary die member, a second plunger part hinged to the first plunger part and slidable within the guide, an operating shaft journaled in the stand, a cam arm mounted on one end of the shaft for oscillating movement through substantially 180°, a link pivotally connected to the cam arm and having a pivotal connection with the second plunger part, a hand lever fixed to the opposed end of the shaft, a stop position on the first plunger part to one side of the vertical center line thereof, and an elongated, fixed abutment on the stand disposed in the path of the stop and extending laterally therefrom and adapted to slidably contact the stop as the said first plunger part leaves the guide to secure pivotal movement of the said plunger part.

7. In a device of the character described the combination of a stand having a vertical guide formed therein, a stationary die member mounted on the stand, a first plunger part having its lower portion slidable into and out of the guide, a complementary die member mounted on the upper portion of said plunger part and movable thereby toward and away from the stationary die member, a second plunger part slidably positioned within the guide for reciprocating movement therein, a jointed connection between the adjacent ends of the plunger parts, an operating shaft journaled in the stand, a cam arm mounted on the rearward end of the shaft for oscillating movement between two opposite, substantially vertical positions, a link pivotally connected to the cam arm and having a pivotal connection with the lower end of the second plunger part, a hand lever fixed to the forward end of the shaft, a stop pin fixed to the first plunger part and extending therefrom in a position adjacent the jointed connection and rearwardly of the vertical center line of said connection, and an elongated, fixed abutment on the stand disposed in the path of the pin and extending rearwardly therefrom for slidably engaging the pin as the first plunger part leaves the guide to secure pivotal movement of said plunger part as the parts approach their upper inoperative positions.

8. In a device of the class described a stand, heated, relatively movable die members sustained by the stand, a reversible operating means on the stand for moving said die members toward and away from each other, a shifting element connected to the means, a warning signal for the stand, a switch for the warning signal, a switch actuating member mounted adjacent the element, drive means for uniformly moving the said member in a switch closing direction, and a drive connection between the shifting element and the member for moving the member in a direction counter to its switch closing direction when the said operating means moves the die members apart.

9. In a device of the character described the combination of a stand, a heated, stationary die member sustained by the stand, a plunger mounted for reciprocating movement in the stand, a heated, pressure applying die member carried by the plunger and movable thereby toward and away from the stationary die member, reversible operating means for reciprocating the plunger, an oscillating element connected to said means, a warning signal for the stand, a switch for the signal, a rotatable switch actuating member mounted on the stand coaxially with the element, a synchronous motor for rotating the member in a direction to close the switch, and a setting arm carried by the oscillating element for rotating the member a predetermined distance in a direction counter to its driven movement when the said operating means moves the die members apart.

10. In a device of the character described the combination of a stand, a heated, stationary die member sustained by the stand, a plunger mounted for reciprocating movement in the stand, a heated, pressure applying die member carried by the plunger and movable thereby toward and away from the stationary die member, reversible operating means for reciprocating the plunger, an oscillating element connected to said means, a warning signal for the stand, a switch for the signal, a rotatable switch actuating member mounted on the stand coaxially with the element, a synchronous motor for rotating the member in a direction to close the switch, a rotatable setting arm carried by the oscillating element for rotating the member a predetermined distance in a direction counter to its driven movement when the said operating means moves the die members apart, and selective detent means between the arm and the oscillating element.

MITCHELL A. HALL.

REFERENCES CITED

The following references are of record in the file of this patent:

UNITED STATES PATENTS

| Number | Name | Date |
|---|---|---|
| 1,609,694 | Chandler | Dec. 7, 1926 |
| 1,655,192 | Murphy | Jan. 3, 1928 |
| 1,866,874 | Barnes | July 12, 1932 |
| 1,969,361 | Fajen | Aug. 7, 1934 |
| 1,977,237 | Methe | Oct. 16, 1934 |
| 2,009,791 | Shroyer | July 30, 1935 |
| 2,039,218 | Gavoroff | Apr. 28, 1936 |
| 2,262,279 | Gomersall et al. | Nov. 11, 1941 |
| 2,308,091 | McCullough | Jan. 12, 1943 |
| 2,463,439 | Strictelmeier | Mar. 1, 1949 |